Patented Oct. 26, 1937

2,097,229

UNITED STATES PATENT OFFICE 2,097,229

ICE CREAM OR ICE MILK MIXTURE, AND PROCESS OF MAKING SAME

Howard J. Lucas, Pasadena, and Harland C. Green, San Diego, Calif., assignors to Kelco Company, Los Angeles, Calif., a corporation of Delaware No Drawing. Application May 23, 1935, Serial No. 23,134

11 Claims. (Cl. 99—136)

Our invention is an improvement in manufactured ice creams and ice milks, and the process of making same, and the principal objects of the invention are to provide a lighter and fluffier ice cream or ice milk which will be of superior quality and of improved texture, the same containing a vegetable stabilizer leaving no residue when melted, and having an apparent increase of butter fat; also to provide an ice cream mix which may be more quickly frozen, and an ice cream in the manufacture of which the usual step of homogenization may be omitted, as hereinafter more fully explained.

Heretofore manufactured ice creams, made in quantities for commercial purposes, have usually been made with gelatin, and it has also been heretofore attempted to use alginates in place of gelatin as a stabilizer; but such efforts have been unsuccessful because of the fact that the alginate had to first be dissolved in water and then added to the ice cream mix. This procedure added an extra step to the process of manufacture, and moreover was objectionable in that it reduced the solids content in the final ice cream by the amount of water added. Such alginates also at times caused off-flavor, and imparted a distinct color to the ice cream mix, and moreover the heretofore known sodium alginates produced no better cream than that stabilized with gelatin.

We have discovered that the use of an alginate prepared in accordance with methods disclosed in the applications of Harland C. Green, Serial No. 721,829, filed April 21, 1934 Patent No. 2,036,934, dated April 7, 1936; Howard J. Lucas, Serial No. 733,530, filed July 2, 1934; and Donald E. Clark and Harland C. Green, Serial No. 4,412, filed January 21, 1935, Patent No. 2,036,922, dated April 7, 1936, produce a superior product, since such alginates are made from high viscosity alginic acid, are diluted with sugar, and have phosphates or the equivalent incorporated therein. These alginate compounds consist of high viscosity sodium alginate; tri-sodium phosphate or the equivalent in an amount equal to approximately 10% of the sodium alginate content; and a substance to further aid dissolving such as sugar, or dextrine or a combination thereof.

Besides sodium alginate, potassium or other edible, water soluble alginic acid salts may be used, or a combination of these salts may be used.

The trisodium phosphate may be replaced, wholly or in part, by some other edible, water-soluble phosphate, such as potassium or ammonium phosphate, or by some edible, water-soluble salt, such as sodium, potassium or ammonium carbonate, citrate or lactate, which can form an insoluble calcium salt when it is added to a solution of a soluble calcium salt such as calcium chloride.

The aforesaid alginates can be added directly to the ice cream mix during its pasteurization step when a temperature of 140°–160° F. has been reached, and this direct addition eliminates the necessity of first dissolving the product in water; and thus greatly simplifies the manufacture. The cost of such alginates compared with its stabilizing efficiency makes it as inexpensive or even less inexpensive to use than gelatin.

The sodium alginate product imparts no flavor whatsoever to the ice cream mix other than a very slight sweetness due to the sugar present, but this is not objectionable because sugar is generally added to all ice milks and ice creams. Furthermore the small amount of such sodium alginate required, as compared with the alginates heretofore used, causes a reduction in the color and moreover reduces the possibility of the occurrence of any off-flavor due to the fact that the sugar and dextrine are themselves colorless and lacking any distinctive flavor except sweetness. Due to the high viscosity or high colloidal efficiency of the aforesaid alginates they are able to hold so much more water for a given amount that no sliminess is developed, and we are therefore able to produce a stable ice cream without any objectionable sliminess, and hence our product is more acceptable to the trade.

The employment of the foresaid sodium alginates therefore has the following practical advantages over the use of gelatin, starch, gums and gel-forming materials since it provides for the ice cream—

(1) An improved texture in that the small ice crystals which grow in ice cream do not become as large with ice cream manufactured with said alginates as in ice cream manufactured with gelatin. The usual method of detecting texture is by tasting, since ice crystals are easily felt on the tongue, and a great difference has been noted both at the time of manufacture of the ice cream and by tests of the ice cream with photomicrographs which show a finer crystal growth in ice creams made with said alginate than in corresponding gelatin ice creams, even after several weeks exposure.

(2) Absence of residue when melted, since ice cream made with said alginate, when placed on a wire mesh screen, melts and passes completely through the screen leaving no residue, this residue being very noticeable when ice cream containing alginate is tasted as compared with ice cream containing gelatin or gums. The use of gums leaves an objectionable coating or aftertaste in the mouth, whereas products made with said sodium alginate melt cleanly in the mouth and taste fresher.

(3) A vegetable stabilizer as compared with gelatin which is of animal origin and therefore objectionable to the Jewish trade.

(4) An apparent increase in the butter fat content of the product, in that ice cream containing 10½% butter fat and ¼% of said alginate compound tastes as rich as a mix containing 12½% butter fat and .3% gelatin. As the butter fat content of ice creams is the most important ingredient from a cost standpoint, this difference is a very desirable feature from the standpoint of the ice cream manufacturer.

Recently continuous freezers have appeared on the market which produce a very smooth ice cream. However, when gelatin or gums are used to stabilize the ice cream, the resulting product is slimy and appears over-stabilized unless a smaller amount of gum or gelatin is used, in which case the material, in a few weeks time in a dealer's cabinet where slight temperature fluctuations are continually occurring becomes coarse. The aforesaid alginates, due to their superior colloidal efficiency do not give a slimy or over-stabilized product when first frozen in a high speed mixer, and will also prevent the growth of the ice crystals so that the ice cream continues to taste smooth.

In the manufacturing operation of ice cream, as well as in the final product we also find novel characteristics when the aforesaid alginates are used, which are valuable to the ice cream manufacturer. One is the fact that an ice cream mix containing sodium alginate will whip faster than ice cream mixes containing other stabilizers. This also means that the amount of air that is incorporated with ice cream can be higher when said alginates are used and therefore a lighter, fluffier ice cream can be obtained.

Furthermore, the duration of the freezing time is reduced. This means that an ice cream manufacturer can increase production by the use of the aforesaid sodium alginate as compared with gelatin. Thus, a .3% gelatin mix requiring 13 minutes of freezing can be frozen in 10 minutes when .2% of sodium alginate compound is substituted for the gelatin. This represents an increase in capacity of an ice cream plant of over 20% with a corresponding reduction of labor cost in freezing.

Another manufacturing advantage is that the step of homogenization, which is usually performed between pasteurization and cooling, may be omitted when using the aforesaid alginate, but cannot be omitted when using gelatins and other ingredients without obtaining a coarser product. We have found that when this homogenization step is omitted the said sodium alginate, being an unusually efficient colloid, prevents reconglomeration of the fat globules on cooling and thereby enables homogenization, which is simply the breaking up of these fat globules, to be omitted. This is a most important feature for growing or new manufacturing plants since it enables the purchase of a homogenizer to be omitted, and in plants where homogenizers are already installed, use of said alginate reduces operation costs by permitting the mix to be by-passed around the homogenizer.

In preparing our ice cream mix we prepare a mixture of butter fat, milk, sugar and water, and then heat this mixture in a pasteurizer to about 160° F. We then add the aforesaid sodium alginate, and agitate the mixture for a few minutes, and then pass this product through a homogenizer (although homogenization can be omitted). Following this step the mix is cooled, and passed into a holding or aging tank. The product is then frozen, air being incorporated during the freezing and whipping action to give a lighter, fluffier, ice cream. Most ice creams contain about 80 to 100% by volume of air. This freezing is stopped just before the ice cream is too hard to flow readily, and the mass is then removed from the freezer and put into containers. These containers are then placed in the hardening room at a temperature between 0 and —30° C. where it is kept until required.

The amount of the said alginates required to give optimum results depends largely on the formula of the ice cream being manufactured. A mixture containing about ½% by weight of a compound of high viscosity sodium alginate and phosphate and sugar may be used. A mix high in total solids requires less alginate than one low in total solids.

We claim:—

1. The process of manufacturing ice cream comprising the step of mixing together butter fat, milk, sugar and water; pasteurizing the mixture at a temperature of about 140°-160° F.; adding a milk and water soluble stabilizing vegetable compound of high viscosity edible water-soluble alginate, and an edible water-soluble ortho phosphate, and a sweetener to aid dissolving, to the mixture while at said elevated temperature; whipping and freezing the mixture.

2. The process of manufacturing ice cream comprising the step of mixing together butter fat, milk, sugar and water; pasteurizing the mixture at a temperature of about 140°-160° F.; adding a milk and water soluble stabilizing vegetable compound of high viscosity sodium alginate, trisodium phosphate and a sweetener to aid dissolving to the mixture while at said elevated temperature; whipping and freezing the mixture; and incorporating air in the product during the whipping and freezing step.

3. A mixture for use in making ice cream and ice milk, containing about ½% by weight of a stabilizing compound comprising high viscosity sodium alginate, trisodium phosphate and sugar.

4. A mixture for use in making ice cream and ice milk, containing a stabilizing compound comprising an edible water-soluble alginate, and an edible water-soluble phosphate which will form an insoluble calcium salt when added to a solution of a soluble calcium salt.

5. A mixture of use in making ice cream and ice milk, containing a stabilizing compound comprising an edible water-soluble alginate, an edible water-soluble phosphate which will form an insoluble calcium salt when added to a solution of a soluble calcium salt, and a sweetener to aid dissolving.

6. The process of manufacturing ice cream comprising the step of mixing together butter fat, milk and sugar, pasteurizing the mixture at a temperature of about 140°-160° F.; and adding a milk and water soluble stabilizing vegetable compound of a high viscosity edible water-soluble alginate, an edible water-soluble ortho phosphate, and sugar, to the mixture while at said elevated temperature; and thereafter whipping and freezing the mixture.

7. The process of manufacturing ice cream comprising the step of mixing together butter fat, milk, and sugar; pasteurizing the mixture at a temperature of about 140°–160° F.; and adding a milk and water soluble stabilizing vegetable compound of a high viscosity sodium alginate, trisodium phosphate, and sugar, to the mixture while at said elevated temperature; and thereafter whipping and freezing the mixture.

8. A mixture for use in making ice cream and ice milk, containing about ¼% by weight of a stabilizing compound comprising high viscosity sodium alginate, trisodium phosphate, and sugar to aid dissolving.

9. The process of manufacturing ice cream comprising the step of mixing together butter fat, milk and sugar, pasteurizing the mixture at a temperature of about 140°–160° F.; and adding a milk and water soluble stabilizing vegetable compound of a high viscosity edible water-soluble alginate, an edible water-soluble ortho phosphate, and dextrine to the mixture while at said elevated temperature; and thereafter whipping and freezing the mixture.

10. The process of manufacturing ice cream comprising the step of mixing together butter fat, milk, and sugar; pasteurizing the mixture at a temperature of about 140°–160° F.; and adding a milk and water soluble stabilizing vegetable compound of high viscosity sodium alginate, trisodium phosphate, and dextrine to the mixture while at said elevated temperature; and thereafter whipping and freezing the mixture.

11. A mixture for use in making ice cream and ice milk, containing about ¼% by weight of a stabilizing compound comprising high viscosity sodium alginate, trisodium phosphate, and dextrine to aid dissolving.

HOWARD J. LUCAS.
HARLAND C. GREEN.